(12) United States Patent
Yamada

(10) Patent No.: US 11,191,385 B2
(45) Date of Patent: *Dec. 7, 2021

(54) POT BOIL-OVER PREVENTION DEVICE

(71) Applicant: Alyson Yamada, San Diego, CA (US)

(72) Inventor: Alyson Yamada, San Diego, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/601,002

(22) Filed: Oct. 14, 2019

(65) Prior Publication Data

US 2020/0037807 A1     Feb. 6, 2020

Related U.S. Application Data

(63) Continuation-in-part of application No. 15/382,497, filed on Dec. 16, 2016, now Pat. No. 10,441,104.

(60) Provisional application No. 62/268,355, filed on Dec. 16, 2015.

(51) Int. Cl.
     *A47J 27/58*     (2006.01)

(52) U.S. Cl.
     CPC .................................. *A47J 27/58* (2013.01)

(58) Field of Classification Search
     CPC .......... A47J 37/10; A47J 27/002; A47J 27/05; A47J 2027/043; A47J 37/1209
     USPC .......... 99/348, 403, 413, 444, 447, 450, 495
     See application file for complete search history.

(56) References Cited

U.S. PATENT DOCUMENTS

2015/0208847 A1*   7/2015   Carson .................... A47J 36/16
                                                         99/443 R

* cited by examiner

*Primary Examiner* — Phuong T Nguyen
(74) *Attorney, Agent, or Firm* — Donn K. Harms

(57) ABSTRACT

A boil-over prevention device is provide which is adapted to a bottom surface to engage the rim of the sidewall surrounding the open end of a pot. A top surface of the body of the device curves around to redirect escaping fluid streams from the pot, to a distal edge of the ramp and back into the open end of the pot.

10 Claims, 4 Drawing Sheets

POT BOIL-OVER PREVENTION DEVICE

This application is a continuation in part application to U.S. patent application Ser. No. 15/382,497 filed on Dec. 16, 2016 which claims priority to U.S. Provisional Patent Application Ser. No. 62/268,355, filed on Dec. 16, 2015, both of which are incorporated herein in their respective entirety by this reference thereto.

BACKGROUND OF THE INVENTION

1. Field of the Invention

The present invention relates to kitchen utensils for cooking. More particularly the disclosed device and method relates to a removably engageable device adapted for operative engagement positioned between conventional cookware such as cooking pots, and pot lids, to an as-used position wherein the device prevents spillage from boiling liquids within the pot.

2. Prior Art

Cooking throughout the world employs pots and pans which are configured for positioning over a heat source such as a gas or electric burner. It is widely known that many cooking processes include the propensity of the food being cooked to suddenly form bubbling or foam layers at the food or liquid surface while being cooked with cookware such as pots. As a consequence, unless such cooking processes are constantly monitored, the rapidly rising foam or liquid layers can overcome the rim of any pot of practical dimensions. This can occur whether a lid is engaged over the pot or not. Such an occurrence results in the overflow onto the stove, counter, floor or user, of hot liquid and food.

An incidence of scalding, hot liquid escaping the confines of a cooking utensil results in a number of potential problems and none are desirable. At best, the escaping liquid will cover the stove and once cooled will require a difficult cleaning of multiple surfaces of the stove and burner. More significantly, escaping hot liquids can cause serious injury to persons adjacent the pot. As a consequence, such liquid and food overflows are messy, waste food, pose burning and slipping risks, and can create noxious odors if they come in contact with flames.

To date, such overflow incidences have been primarily avoided through careful control of the application of heat to the cooking vessel based various considerations of the user concerning the cooking liquids, pot sizes and configurations, and burner capabilities. This technique, however, is unreliable and requires considerable experience and knowledge of the specific utensils. Further, it requires ongoing diligence by the user on the cooking vessel during use. Such diligence is easily dissuaded in a busy kitchen which frequently misdirects user attention. As such, there is a constant threat of a boil over of the proverbial unwatched pot.

Although several overboiling prevention devices are currently available, such means are often cumbersome to the cooking process, are difficult to employ and clean. Further, such devices are not configurable for adaptation to operatively engage a large range of pot and lid shapes and sizes.

As such, there is an unmet need for an overboil prevention device which is employable irrespective of the attention of the user, to prevent food and liquid from boiling over an unwatched pot. Such a device should be configurable to be adapted for removable engagement whereby it is easily affixed to and removed from a large range of pot sizes and designs. Further, such a device, once engaged to an as-used position on the pot of choice, should not be a physical impediment to use of the pot which would overburden the user during cooking.

SUMMARY OF THE INVENTION

The device herein disclosed and described achieves the above-mentioned goals through the preventing of overboiling of liquids and food from a pot or pan during heating on a cooking surface such as a stove burner. The device has an annular or ring-like body surrounding an opening, and the body is configured with a first or bottom surface which is adapted for engagement with the rim or distal edge of the sidewall of a pot to an engaged or as-used positioning.

So located on the rim, with the opening through the annular body axially aligned with a surrounding, the open end of the pot defined by the rim, the body of the device on a top or second surface, has an annular surface edge portion which is adapted for operative positioning of the lid for the pot to which the body is engaged. So positioned in a sandwiched engagement between the distal edge of the pot sidewall and the lid, the body of the device allows normal use of the pot or pan for cooking with virtually no extra effort on the part of the user to accommodate it. In this as-used or operative positioning, the body of the device is configured with a curved interior surface wall which curves outwardly beyond the sidewall and back toward the interior of the pan. This curvature has been found in experimentation to form a ramp which employs the force of the exiting fluid stream to project it back into the pot. It also provides an annular reservoir surrounding and elevated above the top of the rim, which will hold any overflow and thereby will prevent boiling and foaming liquid in the pot from spilling out of the pot while cooking.

The device has the body formed as an annular ring surrounding an opening, which may be sized and adapted for engagement to accommodate one, or a specific range of pot diameters. In this fashion, one of a plurality of multiple size configurations of the device can be employed while employing any size of commercially available pots. In one preferred configuration of the device, the body of the device is adapted for engagement to the annular distal edge of the sidewall of a pot in a fashion which includes both an exterior fastening surface and an interior fastening surface, both of which are provided to frictionally adhere to opposing side surfaces of the sidewall of a pot and hold the lid.

The bottom or first surface of the annular body of the device in this mode, is adapted in configuration to adhere to distal edge or rim of the sidewall and outer edge of any pot, which has a pot diameter between a set given range. This mode of engagement of the body to the pot is in a corresponding device size and formed of an elastic and heat resistant material such as silicone or neoprene, which will elongate during engagement and form an elastic or frictional fit removable connection to the pot. The bottom surface of the body is adapted to engage the rim of the pot with an annular cavity. The height, thickness, and cavity shape of the exterior fastening surface should be sized such that the device can accommodate pots with rolled, flanged or flat rims positioned at the distal end of the sidewall of the intended pot.

When the body of the device is formed to elastically enlarge and contract to a biased engagement with the exterior of the rim, preferably, the height and thickness of the annular exterior fastening surface should be between 1% and 7%, and 0.5% and 4% of the pot diameter respectively.

Additionally, in this elastic and size adaptive mode of the device, an interior fastening surface, which provides increased adhesion to the sidewall by frictional engagement with interior face adjacent the rim of the pot, can be provided. As conventional pot lids are conventionally designed with an outer diameter or flange adapted for engagement and securement to an interior surface edge at the circumference surrounding the open end of the pot, the top or second surface of the annular body of the device adjacent the interior circumference thereof, should be adapted with an upward slanting surface or a ledge to accommodate proper positioning of the lid. This ledge or slanting surface leads to the curved surface providing the means to hold and redirect fluid flow back into the pot.

The annular body of the device may be adapted on the first or lower side, with a fastening surface sized for easy connection to one or a plurality of pots. Such, as noted, can be through an elastic engagement with the exterior of the sidewall of the pot, or a slot formed into the bottom surface adapted to engage both sides of the sidewall at the rim. Alternatively, a plurality of such slots may be formed in concentric sequentially larger sized circles, to allow the body to engage a pot having a diameter where the rim or distal edge of the sidewall, is substantially the same as one of the diameter of one of the slots. Such will allow the body of the device to engage a much larger number of different diameter pots.

In all modes, with the body in the as-used position engaged with the rim, the body of the device should be formed of a material and shape which concurrently maintains durability through repeated use while withstanding the weight and force of the lid. The surface of the annular body of the device should be adapted to easy and snugly connect while accommodating a range of pot and lid straight, folded or flanged rim designs.

In all preferred modes of the device herein, the annular body surrounding the opening, has a curved protrusion which forms a curved surface and ramp upon the upper surface of the body.

This curved ramp extends from an annular edge portion surrounding the opening on the top surface for supporting the lid, in a first direction away from the open end of said pot. At a central portion of the formed ramp, it is curved to extend in a second direction running toward open end of said pot, to a distal edge of the ramp which defines a circumference of the opening the body surrounds. This redirects any fluid escaping from the open end of the pot in a direction outside or away from the rim and open end, back into the open end of the pot.

The ramp curves to an elevation above the rim from the engagement of the body at the rim edge, and extends to a distal edge of the ramp which is preferably at or overhanging a line running from the pot sidewall. As noted, the curve of the upper surface forming the ramp and elevation above the sidewall to the distal edge of the formed ramp in this fashion, is sized and shaped to catch and redirect overflowing fluid streams and use their exiting force to direct them back into the pot. Such a curved configuration of the top or facing surface of the annular body, is thereby configured to prevent the bubbles and boiling liquid from such exiting fluid streams from rising past the circumferential edge of the curved portion, and prevent spillage during cooking.

In experimentations with differing curved designs it was found that significantly improved results were achieved when the curved protrusion is sized with a height of between 15% and 5% of the diameter of the pot. Additionally, the distal edge of the curved protrusion should terminate at a point above the rim at line extending from the sidewall to render the circumference of the opening through the body, formed at the distal edge of the ramp, easy to fit the lid through during use. The distal edge of the ramp can terminate a distance from the outer edge of the pot, making that circumference larger than that of the lid, by positioning the distal edge a distance from a line running through and above the sidewall, between 5% and 15% of the height of the curved protrusion and at a tangential angle of between 25 and 60 degrees from the vertical axis. Finally, it has been found in experimentation that the ramp, so formed, works well to redirect the fluid stream from the pot, under force, if the inner radius of the ramp formed on the curved protrusion of the device is between 30% and 65% of the height of the curved protrusion.

Employing a preferred elastic mode of the body of the device, as described herein, engagement is accomplished when the user expands the fastening surface, or the slot depending into the bottom surface, to fit upon or around the rim of the intended pot and presses downwards on the device so that the fastening surface engages with the exterior of the rim and with the interior surface if a slot is employed. The user can then optionally place the lid atop the top surface of the body and begin to cook. If liquid within the pot overboils, the pressurized fluid stream will automatically unseat the lid, and bubbles will contact and be suppressed and redirected by the ramp of the body of the device.

In one preferred mode of the device, a configuration eliminates the need for an interior fastening feature and relies solely on the elastic and frictional forces from the exterior fastening feature against the outer circumference of the pot and the outer pot rim to maintain adhesion. As pot and lid engagement means may vary, this mode of the device offers more universal application through eliminating any interaction with the lid. The sizing of the exterior fastening feature and the curved protrusion, and the application and use of the device in its first and second preferred modes are identical.

In all preferred modes, the body of the device should be composed of an elastic and substantially flexible, heat resistant and waterproof material such as one or a combination of plastic, silicone, neoprene, polymeric material or rubber. For a mode of the device which is fixed in size to engage a single sized pot, the body may be formed of a non elastic material that is heat resistant such as heat resistant polymeric material, wood, or even metal such as aluminum or stainless steel or the like.

OBJECTS OF THE INVENTION

It is an object of this invention to provide the device to be adapted in configuration to easily and operatively engage to a pot and thereafter prevent overboiled bubbles and fluid streams from spilling during cooking.

It is an object of this invention to form the device with a body which will a accommodate a large range of pots and lid sizes and designs.

These together with other objects and advantages which become subsequently apparent reside in the details of the construction and operation as more fully hereinafter described and claimed, reference being had to the accompanying drawings forming a part thereof, wherein like numerals refer to like parts throughout.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

BRIEF DESCRIPTION OF DRAWING FIGURES

Figure 3:
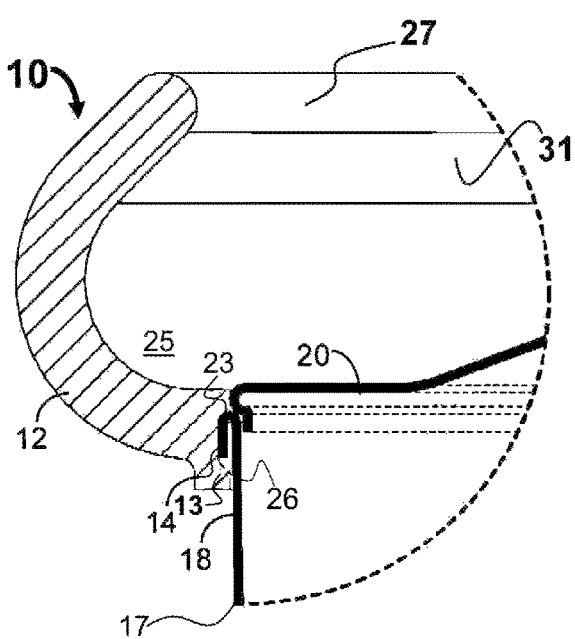

FIG. 3 displays a sectioned view of the a preferred mode of the device wherein the first or lower surface is adapted to engage the rim of the pot by contact with only one side of the sidewall of the pot in an elastic biased engagement.

Figure 4:
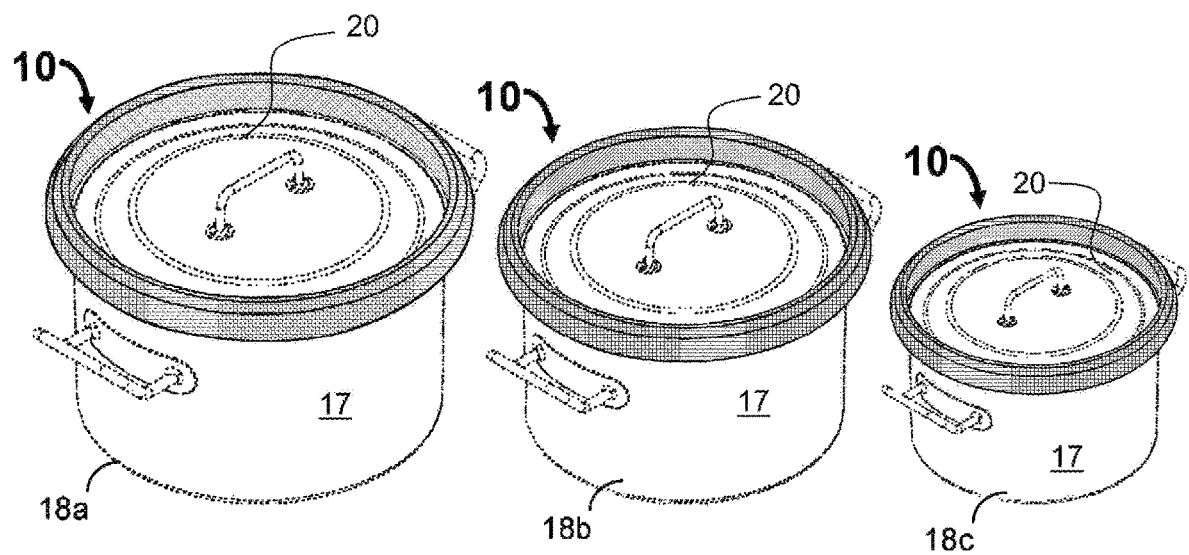

FIG. 4 shows an array of the device herein, where each is formed of a body which is adapted to engage a rim of specific pot diameter sizes.

Figure 5:
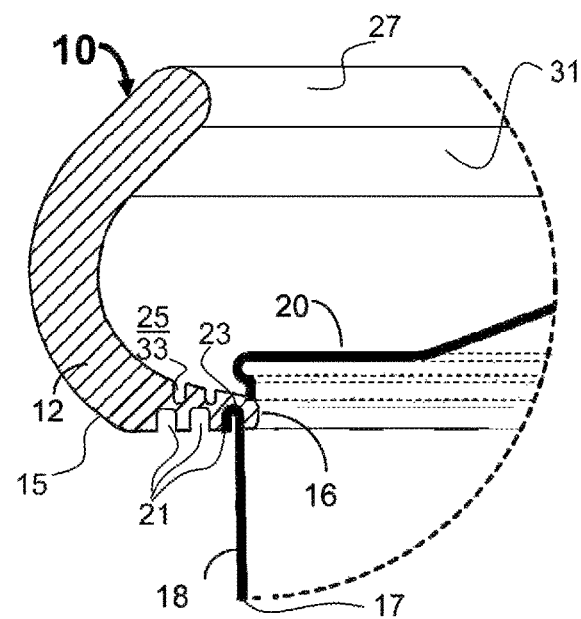

FIG. 5 shows another mode of the device where the first side of the body is adapted with a plurality of annular slots of differing diameters for engaging pots with matching diameters.

Figure 1:
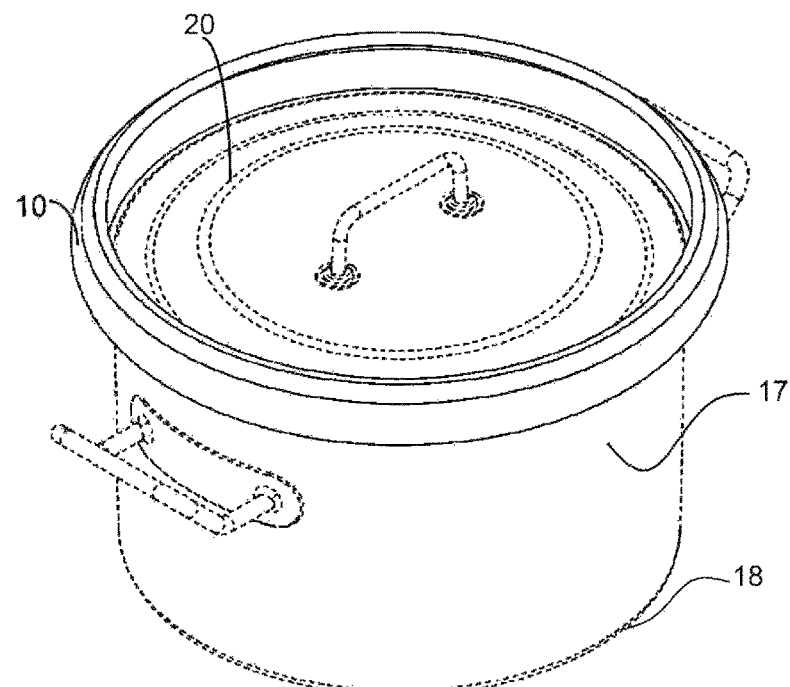
FIG. 1 depicts a perspective view of the device in an as-used positioning, with the first or lower surface operatively engaged with the rim of a pot during use.
Figure 2:
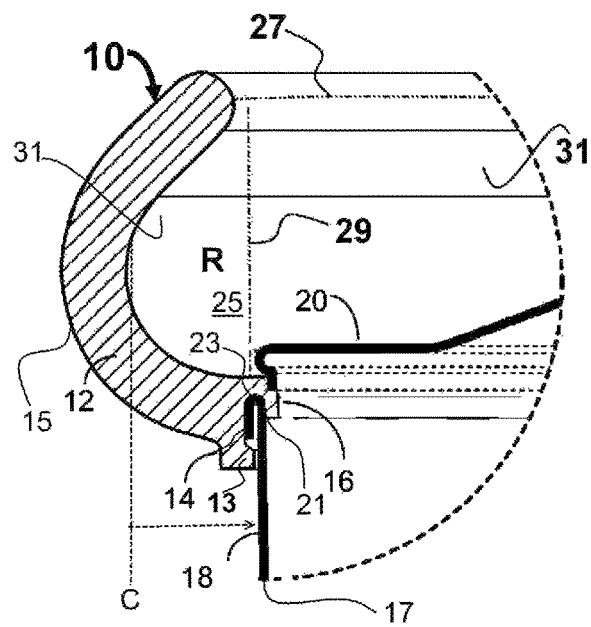
FIG. 2 shows a cross sectioned view of one preferred mode of the device showing the first or lower side of the body adapted to engage a rim surrounding an open end of a pot with a slot, and the curved ramp on the opposite second side of the body.
Figure 6:
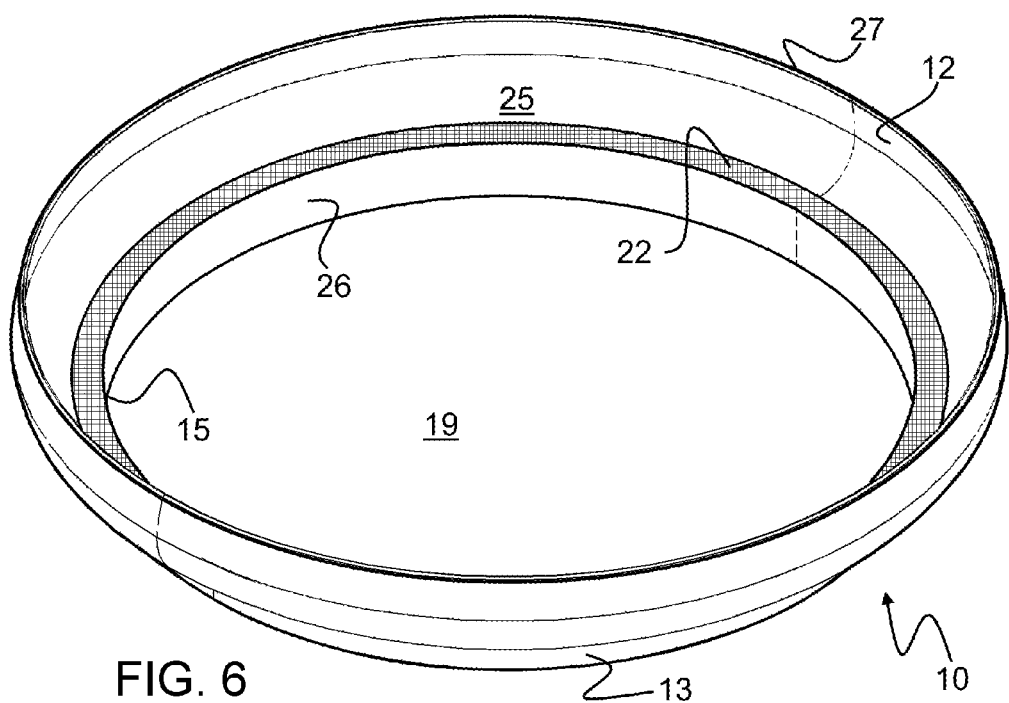

FIG. 6 depicts the device in a mode similar to that of FIGS. 2-3 having a first surface adapted to engage a pot sidewall wherein a ledge may be provided at the base of the curved protrusion on the top or second surface, which is adapted for positioning of a lid thereon with the device in the as-used position of FIG. 1.

Figure 7:
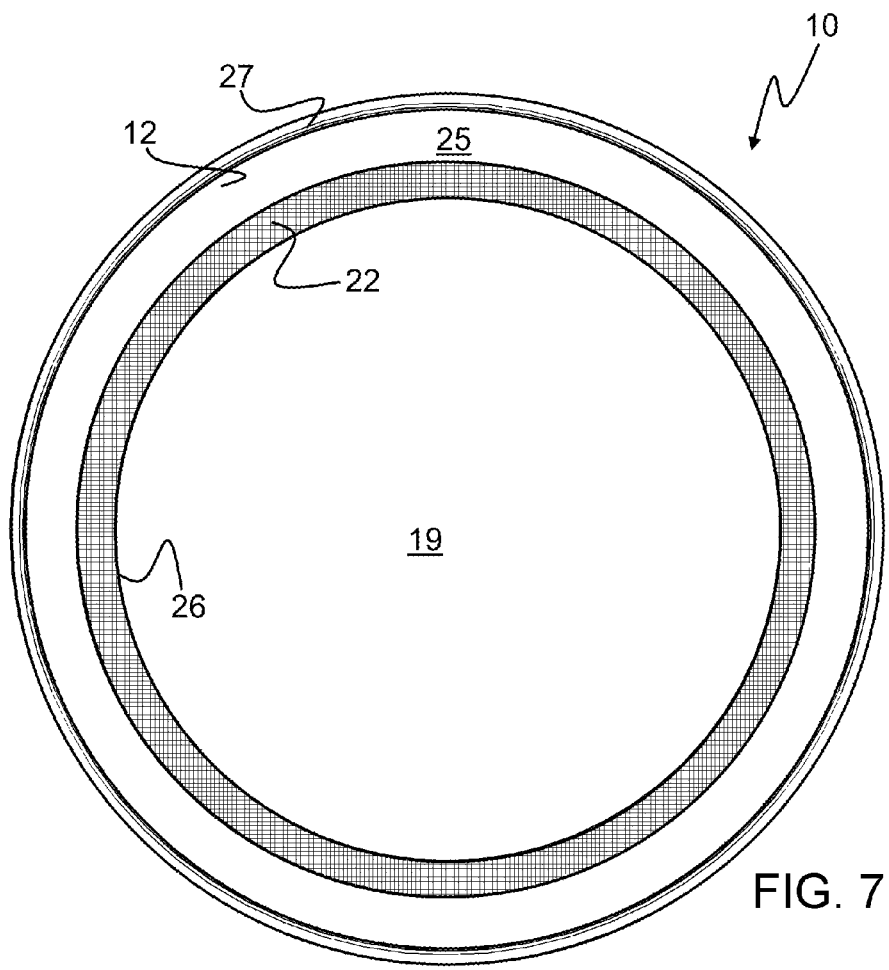

FIG. 7 is an overhead view of the second surface or top of the body of the device showing a substantially planar annular edge portion adapted for positioning of the lid of the pot thereon which surrounds the opening communicating through the body.

Figure 8:
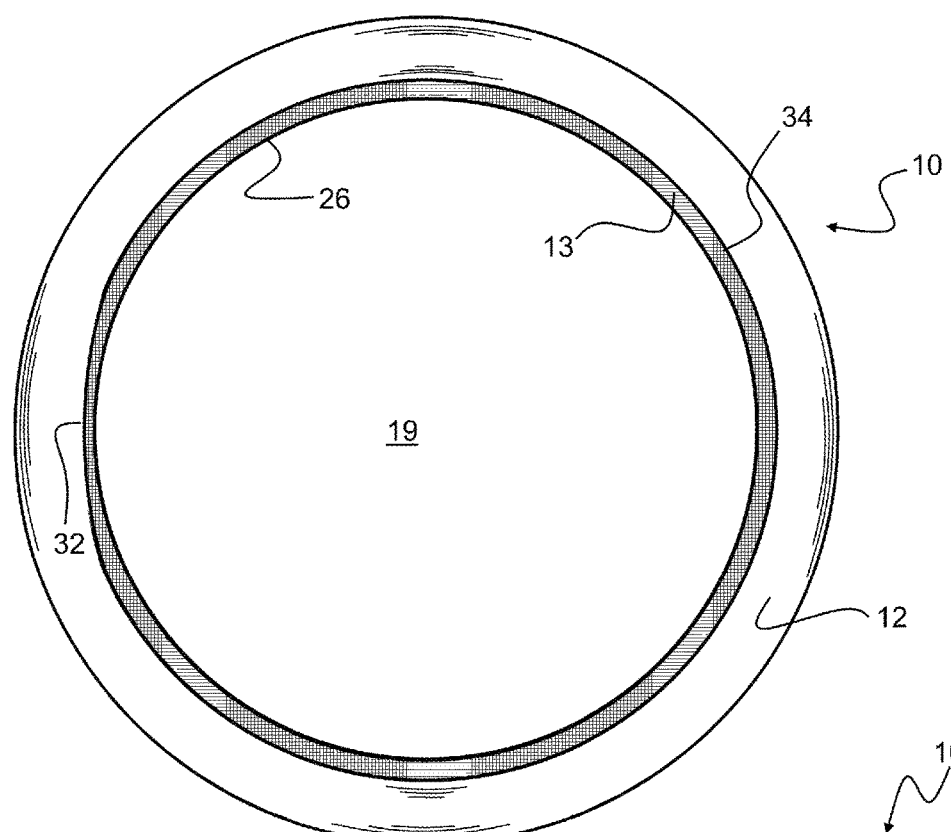

FIG. 8 depicts a view of the first surface or bottom of the body of the device of FIG. 6-7, showing the body having an annular projection having an interior wall surface defining the opening through the body in the same fashion as that of FIGS. 2 and 3 and having an exterior wall surface which tapers toward the inner wall surface to form narrowed portion of the body.

Figure 9:
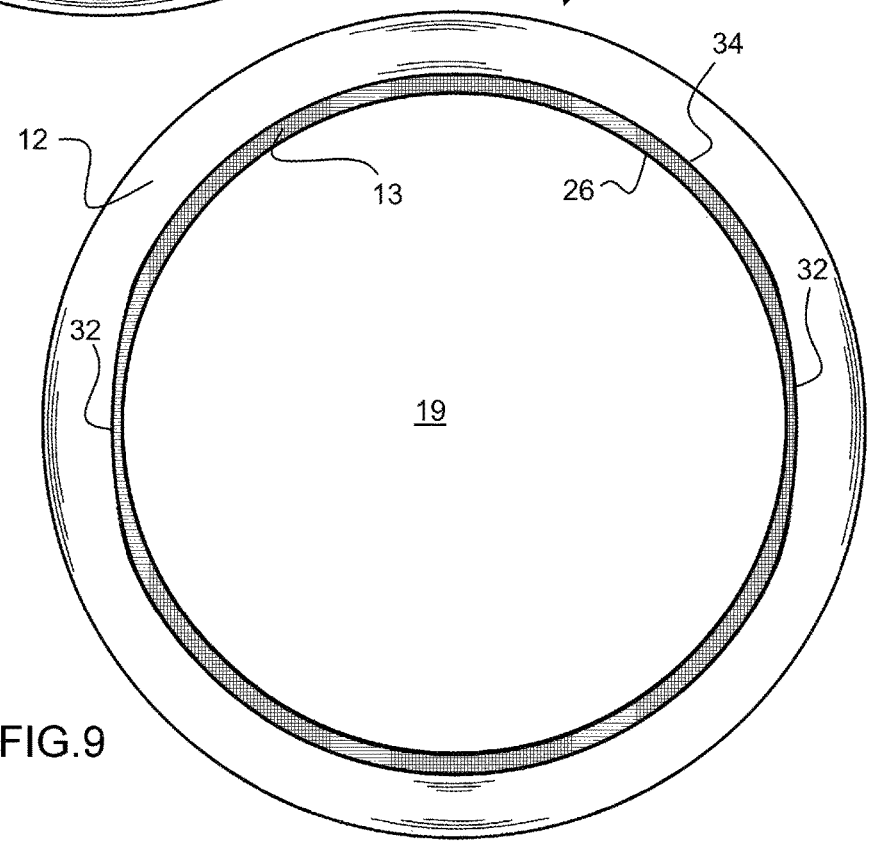

FIG. 9 shows a view of the first surface or bottom of the body similar to that of FIG. 8, but have two tapering portions of the exterior wall surface to form two narrowed portions.

DETAILED DESCRIPTION OF THE PREFERRED EMBODIMENTS OF THE INVENTION

Referring now to the drawings of FIGS. 1-9, there is seen in FIG. 1, the device 10 in an as-used positioning where the first side or lower side is in operative engagement with the distal end or rim of the sidewall of a conventional pot 18. In all modes, the device 10 is engaged to this as-used position with the annular body 15 surrounding the open end of the pot 18, being configured on a first or lower side, to operatively connect to the rim or distal edge of the sidewall 17. So positioned, as noted above, the body 15 of the device 10 is configured on the second or top side to redirect exiting fluid streams back into the open end of the pot 18 through a central opening communicating through the body 15 which may be covered by the lid 20.

As shown in FIG. 1, the device 10 has a body 15 adapted to to removably engage with the pot 18 and to interface between the conventional pot 18 and a lid 20. So positioned, the body 15 surrounds the open end of the pot 18 and is shaped to prevent boiling liquid or a fluid stream exiting the open end of the pot 18, from spilling out of the pot while cooking.

The device 10 may have a body 15 which is sized to accommodate any in a specific range of pot 18 circumferences, using a body 15 formed of elastic material, or it may be configured with multiple diameter body 15 configurations which are adapted in diameter for the body 15 to engage with pots 18 having a rim diameter of a particular size which surrounds the open end of the pot 18 which the lid 20 may cover such as in FIG. 4. In all modes, in the as-used positioning, the opening 19 communicating through the annular body 15, will be axially aligned with the open end of the pot 18 which is surrounded by the rim 16.

Shown in FIG. 2, is one preferred configuration of the body 15 of the device 10, which is adapted on a first or lower side, with at least one slot 21 depending therein. In this mode, the annular body 15 has an annular slot 21 depending into the first surface or bottom which is adapted to contact opposing sides of the sidewall 17 at the rim 23 which defines the diameter of the pot 18. As depicted, the slot 21 depends into the first surface of the body 15 and has an interior contact surface 16 to frictionally adhere to the interior of the sidewall 17 of the pot 18 as well as an exterior contact surface 14 which contacts the opposing side of the sidewall 17. A second or upper surface 25 of the body 15, opposite the first surface, is adapted for positioning of the lid 20 thereon.

The exterior fastening surface 14 allows the body 15 of the device 10 to removably engage with the rim 23 and exterior surface of the sidewall 17 of any pot 18, with a circumference which is within a range specified for the specific corresponding body 15 circumference through an elastic stretched and biased engagement, or a or press fit if the slot 21 circumference is substantially equal to the pot 18 circumference.

The height, thickness, and cavity shape of the slot 21 having the exterior fastening surface 14 per FIG. 2, should be sized such that the device 10 can accommodate pots 18 with rolled, flanged, or flat rims.

Additionally, in this preferred mode of the device 10 the interior fastening surface 16 provides for increased adhesion to the sidewall 17 adjacent the rim 23 of the pot 18. As most lids 20 are designed with an outer circumference or flange for engagement and securement to the rim 23 or to an interior surface of the pot 18, an edge 22 may be positioned on the second surface 25 or top of the annular body 15 opposite the first surface or bottom of the body 15.

The body 15 when adapted on the bottom or first side with the slot 21, should be formed of material adapted to maintain durability through use, while withstanding the weight and force of the lid 20, while engaging the sidewall 17 at the rim 23 and snugly accommodating a range of pot 18 and lid 20 designs.

In all modes of the device 10 the body 15 is formed with a curved protrusion 12, extending above the top or second surface of the body 15. The curved protrusion 12 has a curved second portion of the upper surface 25 portion of the body 15, which is sized and shaped to catch and redirect the fluid stream or overflowing bubbles, and prevent the boiling liquid from rising above the distal edge 27 of the curved protrusion 12. This annular distal edge 27 defines the inner circumference of the curved protrusion 12 portion positioned above the rim 23 through which the lid 20 must pass during use.

In experimentation is was found that the curved protrusion 12 works well if sized with a height 29 from the rim 23 to the distal edge 27, of between 5% and 15% of the diameter of the pot 18. Additionally, the distal edge 27 of the curved protrusion 12 should terminate at a distance at a point substantially inline with the rim 23 and sidewall 17 of the pot 18, or no more than a distance outside the sidewall 17 of between 5% and 15% of the height of the curved protrusion 12.

Further, in all preferred modes of the device herein a ramp 31 is defined on the curved upper surface 25 portion of curved protrusion 12 extending from the body 15 running on the inner radius of the curved protrusion 12 of the body 15 of the device 10. The ramp 31 terminates at the distal edge 27 of the curved protrusion 12 which as noted works well if aligned with the line running through the sidewall 17 above the rim 23, or spaced slightly outside the sidewall 17 as noted above. This forms an inner circumference of the body 15 at the distal end of the curved protrusion 12, which allows for easy passage of the circumference of the lid 20 therethrough. However, if the body 15 is formed of flexible material, the end of the ramp 31 at the distal edge 27 can be located above an area within the confines of the pot 18 sidewall 17. While the interior circumference might be smaller than the diameter of the lid 20, it would easily stretch for movement of the lid therethrough. Further, this would position the end of the ramp 31 above the interior for easier redirection of exiting fluid.

Employing the mode of the device 10 of FIG. 1, to operatively removably engage the sidewall 17 of a pot adjacent the rim 23 for example, as described herein, the user expands the body 15 to engage around the exterior of the sidewall 17 or to position the slot 21 and exterior fastening surface 14 to fit around and on the rim 23 of the intended pot 18 and presses downward on the body 15 of the device 10 so that the sidewall is engaged by an interior surface or the slot 21 engages with the rim 23 and inner diameter of the pot 18. The user can then optionally place the lid 20 upon the upper surface 25 of the body 15 while cooking.

In all modes herein, if liquid within the pot 18 overboils, the pressure will generate a forced fluid stream which will automatically slightly unseat the lid 20, and fluid and bubbles will be forced up the ramp 31 defined by the curved portion of the surface 25 to the distal edge 27 thereof, where the direction of the moving fluid has been changed and redirected back toward the interior of the pot 18. The curved surface 25 or second surface of the body 15, extending from adjacent pot rim 23, to the distal edge 27, also forms a fluid reservoir "R" shown as the area between line 29 and the curved surface 25. This reservoir R, will hold any fluid falling on the lid and running toward the reservoir R, and let it drain back into the pot 18 by draining between the lid 20 and top and curved surface 25 or the annular planar edge portion, if present. The fluid will pass through small gaps present between all lids 20 and the surface 25, which tend to become larger, if pressure builds in the pot 18, and slightly lifts the lid 20.

Another preferred mode of the device 10, operating with the same operation of a ramp 31 and curved protrusion 12 is shown in FIG. 3. This mode of the device 10 has a body 15 configuration which eliminates the need for an interior fastening surface 16, and relies solely on the elastic bias and frictional forces from the biased contact of the surface of the circumference of the inner wall defining the opening 19 as a fastening surface 14 against the outer diameter of the sidewall 17 of the pot 18 at or adjacent the outer pot 18 rim to maintain the removable engagement.

Formed of an elastic heat resistant material, the body 15, in this mode, is adaptable as pot 18 and lid 20 engagements and sizes may vary. This mode of the device 10 offers more universal application through eliminating any interaction with the lid 20, and providing a strong biased engagement of surface of the opening 19 against the sidewall 17, when stretched over the rim 23 of a pot 18. The sizing and operation of the curved protrusion 12, and ramp 31 thereon defined on the upper surface of the body 15, would be the same as above.

FIG. 5 shows another mode of the device 10 herein, which may have a body 15 formed of non elastic material, or elastic material. As shown in FIG. 5, a plurality of concentric slots 21 depend into the first or lower surface of the body 12. Each slot 21 has a progressively larger size from the adjacent slot 21 starting with one slot 21 that is engaged with the rim 23. In this mode, the individual slots 21 can be cut in sizes having circumferences or diameters matching those individual pots 18, and in a non elastic mode, one body 15 will fit as many pots 18 as have a diameter matching that of one of the slots 21.

Alternatively, the body 15 may be formed of elastic material, and any of the plurality of slots 21, from the smallest to the largest, can be stretched to fit upon the rim 23 of a pot 18 having a diameter equal to, or slightly larger than, the slot 21 to which it engages. The upper surface of the body 15 has the same curved surface 25 thereon and allows for seating of the lid 20 which will self-center on the downwardly angled portion of the upper surface of the body 15. Alternatively, upper slots 33 can depend into the upper surface 25 and a lid 20 having a matching diameter to any upper slot 33, will settle therein.

In all preferred modes, the device 10 should be composed of any flexible, heat resistant and waterproof materials from a group including plastic, silicone, polymeric materials, neoprene, and rubber. Non elastic modes of the body 15 may be formed of plastic, metal, or wood.

In FIG. 6 is shown the device 10 a mode similar to that of FIGS. 2-3 having a first surface or bottom side of the body 15 adapted to engage a pot sidewall 17. In a similar fashion to the above noted modes of the device 10 if FIGS. 2-3 and 5, the opening 19 communicates between the first surface of the body 15 which engages with the pot 18 and the top or second surface of the body 15. This opening 19 has a circumference defined by an opening wall 26 communicating between the bottom or first side of the body 15 and the top or second side of the body 15.

Additionally shown are an annular edge 22 surrounding the opening 19 which communicates between the bottom or first surface of the body 15 and the top or second surface of the body 15. This edge 22, when provided, is preferably positioned at the base of the curved surface 25 on the curved protrusion 12 extending from the second surface or top of the body 15, in the same fashion as the aforementioned modes of the device 10.

Shown in FIG. 7 is an overhead view of the top or second surface of the body 15 of the device 10 showing the substantially planar annular edge 22 portion adapted for positioning of the lid 20 of the pot 18 thereon. As shown, this annular edge 22 surrounds the opening 19 defined by the opening wall 26. The annular edge 22 has been found in experimentation to work well, having a width extending between the opening 19 and intersection with the base of the curved protrusion 12, of between 3/8 to 5/8 inches, with a current width of substantially inch working well to seat the perimeter edge of a lid 20 positioned thereon. This annular edge 22 is preferably planar and either level or inclines at an angle from the side thereof adjacent to opening 19, toward and to the base of the curved protrusion 12. An inclining angle of five to ten degrees will work well. So located the edge 22 is adapted for positioning of a lid thereon with the device 10 in the as-used position of FIG. 1.

In FIG. 8 as noted is shown a view of the first surface or bottom of the body of the device of FIG. 6-7. As with the device 10 shown in FIGS. 2 and 3 for example, the body 15 of the device 10 of FIG. 8 has an annular projection 13 extending from the first surface or bottom thereof. The opening 19 communicates through the body 15 from the second or top surface to the first or bottom surface and as noted, has a diameter defined by the opening wall 26 extending through the body 15.

In FIG. 8 is shown a recessed area 32 formed into the first surface of the body 15 such as for example in the exterior circumference of the annular projection 13. This recessed area 32 reduces the width of the annular projection 13 extending between the opening 19 and the exterior circumferential surface 32 of the annular projection 13. The recessed area 32 can be included on the other disclosed modes of the device 10 such as those of FIGS. 2-3. So positioned, this recessed area 32 where the width of the annular projection 13 extending from the first surface of the body 15 reduces the width thereof, provides room for the first surface to accommodate a handle of the pot 18. As shown, the recessed area 32 formed only in the exterior circumference 34 of the annular projection 13 fits between a handle of the pot 18 which may be positioned adjacent the rim 23 shown in FIGS. 2-3. The diameter of the opening 19 is not changed which is preferred to allow the opening wall 26 to form a good seal around the sidewall 17 of a pot 18 to which the device 10 engages.

Currently, a width of the annular projection 13 extending from the first surface or bottom of the body 15 as shown in FIGS. 2-3 and 8-9 is substantially inch as measured between the exterior circumference 34 and the intersection with the opening wall 26 defining the opening 19, in all areas but the recessed area 32. The recessed area 32, in experimentation, has been shown to work well if formed with a width between 3/16 of an inch to 5/16 of an inch and a current favored width of the annular projection in recessed areas 32 being substantially 50% of that of the rest of the annular projection 13 or 1/4 of an inch. It was found after testing, with a large number of pots 18 having handles adjacent the rim 23, that even if 1/4 inch was slightly wide, the body 15 being formed of flexible material can compress slightly if needed. As such, a width of the annular projection 13 portion of the body 15 projecting around the opening 18 from the first surface or bottom of the body 15 in the current most preferred mode of the device 10 is 1/4 of an inch.

Because some pots 18 are known to position two handles on opposite sides of the pot 18, the device 10 can also be formed as shown in FIG. 9 with two opposing recesses 32 formed into the body 15 such as into the exterior circumference 34 of an annular projection 13 extending from the first or bottom surface of the body 15.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications, variations and substitutions are included within the scope of the invention as defined by the following claims.

What is claimed is:

1. A boil-over prevention apparatus comprising:
    an annular body, said annular body having a first surface and a second surface opposite said first surface;
    an opening, said opening having a circumference defined by an opening sidewall communicating between said first surface and said second surface of said body;
    said first surface adapted to removably engage said body to a rim of a sidewall surrounding an open end of a pot, and thereby position said body in an as-used position;
    said opening in said body being axially aligned with said open end of said pot, with said body in said as-used position;
    an edge portion on said second surface of said body, said edge portion extending a width from a first edge thereof surrounding said opening to a second edge thereof, said edge portion configured for positioning a surface of a perimeter edge of a lid of said pot thereon;
    a curved ramp extending from said second surface of said body adjacent said second edge of said edge portion and curving in a first direction away from said open end of said pot, said curved ramp curving from a central portion of said curved ramp to a distal edge of said curved ramp in a second direction running toward said open end of said pot;
    said distal edge of said ramp being elevated a distance above said rim of said sidewall with said body in said as-used position; and
    whereby a fluid stream of boiling liquid escaping from said open end of said pot is directed by said top surface along said curved ramp toward said open end of said pot thereby preventing an overflow of said fluid stream out of said pot.

2. The boil-over prevention apparatus of claim 1, wherein said annular body is configured with said distal edge of said ramp elevated above said rim of said sidewall at a said distance which is between 5% and 15% of a diameter of the pot.

3. The boil-over prevention apparatus of claim 2, wherein first surface is adapted to removably engage said body to said rim of said sidewall by said body being formed of polymeric material which is stretchable to form a removable engagement of said opening sidewall with said sidewall of said pot.

4. The boil-over prevention apparatus of claim 3, wherein first surface has an annular projection extending therefrom and said opening sidewall defines an inner circumference of said annular projection;
   said annular projection having at least one recessed area formed into an exterior circumference thereof; and
   said recessed area configured for positioning between a handle of said pot and said sidewall of said pot when said body is in said as-used position.

5. The boil-over prevention apparatus of claim 4, wherein polymeric material forming said body is stretchable to form a removable engagement with said rim of any of a plurality of said pots where each has a differing respective sized said opening defined by said rim.

6. The boil-over prevention apparatus of claim 3, wherein polymeric material forming said body is stretchable to form a removable engagement with said rim of any of a plurality of said pots where each has a differing respective sized said opening defined by said rim.

7. The boil-over prevention apparatus of claim 1, wherein first surface is adapted to removably engage said body to said rim of said sidewall by said body being formed of polymeric material which is stretchable to form a removable engagement of said opening sidewall with said sidewall of said pot.

8. The boil-over prevention apparatus of claim 7, wherein first surface has an annular projection extending therefrom and said opening sidewall defines an inner circumference of said annular projection;
   said annular projection having at least one recessed area formed into an exterior circumference thereof; and
   said recessed area configured for positioning between a handle of said pot and said sidewall of said pot when said body is in said as-used position.

9. The boil-over prevention apparatus of claim 8, wherein polymeric material forming said body is stretchable to form a removable engagement with said rim of any of a plurality of said pots where each has a differing respective sized said opening defined by said rim.

10. The boil-over prevention apparatus of claim 7, wherein polymeric material forming said body is stretchable to form a removable engagement with said rim of any of a plurality of said pots where each has a differing respective sized said opening defined by said rim.

* * * * *